United States Patent [19]

Hake et al.

[11] 3,778,779

[45] Dec. 11, 1973

[54] LOGIC AND STORAGE CIRCUIT FOR TERMINAL DEVICE

[75] Inventors: Victor E. Hake, Lake Katrine; Allen W. McDowell; Daniel R. Mersel, both of Kingston; Lawrence G. Mosher, Rhinebeck; Stanley O. Stilwell, Staatsburg, all of N.Y.

[73] Assignee: International Business Machines Corporation, Armonk, N.Y.

[22] Filed: Apr. 28, 1972

[21] Appl. No.: 248,686

[52] U.S. Cl. .......... 340/172.5
[51] Int. Cl. .......... G06f 3/00
[58] Field of Search .......... 340/172.5

[56] References Cited

UNITED STATES PATENTS

| | | | |
|---|---|---|---|
| 3,564,509 | 2/1971 | Perkins et al. | 340/172.5 |
| 3,539,997 | 11/1970 | Mahony | 340/172.5 |
| 3,516,073 | 6/1970 | Goss et al. | 340/172.5 |
| 3,407,387 | 10/1968 | Looschen et al. | 340/172.5 X |
| 3,395,400 | 7/1968 | DeWitt et al. | 340/172.5 |
| 3,398,403 | 8/1968 | Ostendorf, Jr. | 340/172.5 |
| 3,374,464 | 3/1968 | Brothman et al. | 340/172.5 |

*Primary Examiner*—Harvey E. Springborn
*Attorney*—William S. Robertson et al.

[57] ABSTRACT

A new logic and storage circuit is provided for a terminal device such as a display or printer used in a data processing system. The circuit includes a shift register that is interconnected with a control unit by a coaxial cable or other two conductor system for transferring serial messages to the control unit and for receiving serial messages from the control unit. The register is connected in parallel with other components of the terminal device. The logic and storage circuit is provided with means for detecting data bits on the two conductor message line and for forming data bits on the line in response to the contents of the register. Means is also provided for decoding control word messages from the control unit and for receiving data messages or transmitting data or status word messages from the terminal device to the control unit.

9 Claims, 22 Drawing Figures

FIG. 2A

| 13 | 12 | 11 | 10 | 9 | 8 | 7 | 6 | 5 | 4 | 3 | 2 | 1 |
|---|---|---|---|---|---|---|---|---|---|---|---|---|
| 0 | P | ACKNOWLEDGE | RESET XMIT CK | ERASE UNPROTECTED | UNLOCK KEYBOARD | SYSTEM READY | WRITE | READ | POLL | 0 | 1 | BUSY BIT |

CONTROL WORD 1

FIG. 2B

| 13 | 12 | 11 | 10 | 9 | 8 | 7 | 6 | 5 | 4 | 3 | 2 | 1 |
|---|---|---|---|---|---|---|---|---|---|---|---|---|
| 0 | P | UNUSED | RESET XMIT CK | SOUND ALARM | START PRINT | FORMAT | | UNUSED | POLL | 1 | 1 | BUSY BIT |

CONTROL WORD 2

FIG. 2C

| 13 | 12 | 11 | 10 | 9 | 8 | 7 | 6 | 5 | 4 | 3 | 2 | 1 |
|---|---|---|---|---|---|---|---|---|---|---|---|---|
| 0 | P | DATA | | | | | | | | | 0 | BUSY BIT |

CU DATA WORD

FIG. 2D

| 13 | 12 | 11 | 10 | 9 | 8 | 7 | 6 | 5 | 4 | 3 | 2 | 1 |
|---|---|---|---|---|---|---|---|---|---|---|---|---|
| SIZE | P | | | | | | INFO PENDING | TRANSMIT CHECK | DEVICE CHECK | | | BUSY BIT |

DISPLAY STATUS WORD

FIG. 2E

| 13 | 12 | 11 | 10 | 9 | 8 | 7 | 6 | 5 | 4 | 3 | 2 | 1 |
|---|---|---|---|---|---|---|---|---|---|---|---|---|
| SIZE | P | UNUSED | PRINT HANG | EQUIPMENT CHECK | UNUSED | NOT READY | INFO PENDING | TRANSMIT CHECK | DEVICE | BUSY | 1 | BUSY BIT |

PRINTERS STATUS WORD

FIG. 2F

| 13 | 12 | 11 | 10 | 9 | 8 | 7 | 6 | 5 | 4 | 3 | 2 | 1 |
|---|---|---|---|---|---|---|---|---|---|---|---|---|
| SIZE | P | DATA | | | | | | | | | 0 | BUSY BIT |

DISPLAY OR PRINTER DATA WORD

LOGIC AND STORAGE CIRCUIT FOR TERMINAL DEVICE

INTRODUCTION

It will be helpful to review the general features and terminology of terminal devices that particularly apply to this invention. A printer, for example, includes mechanical printing and paper handling apparatus and it also includes circuitry that interconnects the printer to receive a message that has been stored in the main memory or other storage apparatus of a data processing system. This message defines the characters that are to be printed and it contains associated control information. Commonly, the apparatus that receives the message from the memory is called a "channel" and operates one or several "control units" which operate one or many I/O or terminal devices. An object of this invention is to provide a new and improved logic and storage circuit that permits interconnecting a terminal device and a control device on a two conductor wire system such as a coaxial table.

SUMMARY OF THE INVENTION

The logic and storage circuit of this invention includes a shift register that is connected to receive data from the control unit serially and to provide a parallel output to other components of the circuit and the terminal device. The circuit is particularly intended to operate with a terminal device having a buffer memory that is substantially larger in storage capacity than the register. For example, the printer already introduced has a buffer memory that stores messages transmitted from the control unit through the shift register. The message in the buffer provide the control and data signals for the printing operation. The circuit is also useful with a terminal display which uses a buffer for storing the image that is to be displayed.

The data waveform on the line connecting the terminal device and the control unit has both data and timing significance, and in one embodiment of this invention the circuit has means for generating its own timing signals from the timing information in the data waveform. In another embodiment, the circuit operates exclusively with internal timing signals but selects the signals to correspond in phase to the message waveform.

The circuit is arranged to respond to and to generate messages in several different formats. Predetermined bit positions of an incoming message identify the message as a control word or a data word. The circuit responds to control words to begin or end a message transmitting or sending operation and it transmits data words to the buffer where they control the operation of the terminal device.

Other summary features of the invention will be presented in the description of a specific embodiment of the invention.

THE DRAWINGS

FIGS. 2A through 2F show the significance of each bit position in various message formats.

THE LOGIC AND STORAGE CIRCUIT OF THE DRAWING

I - Introduction

The description of the preferred logic and storage circuit of this invention has been organized as follows. Section II describes the circuit in terms of the signal lines that interconnect the circuit with a control unit of a data processing system and with other components of the associated terminal device. Section III describes the message format and is an introduction to the description later of the circuits that form and respond to a particular message bit position. Section IV describes the data waveform that represents 1 and 0 bits on the signal line interconnecting the circuit and the control unit. This section also describes the circuits that form data signals and timing signals from these waveforms. Section V describes the shift register that is used for interconnecting the serial messages of the control unit and the parallel message of the other components of the I/O device. This section also describes some of the register status and timing signals. From this general description of the circuit, the remaining components are described as they appear in various operations of operating on messages from the control unit and transmitting messages to the control unit.

The publication "2260 Display Station Models 1 and 2", SY27-2229-1, published 1970, and available from the assignee of this invention, describes a display terminal and provides helpful background information.

II - The Associated System and Components

Figure 1:
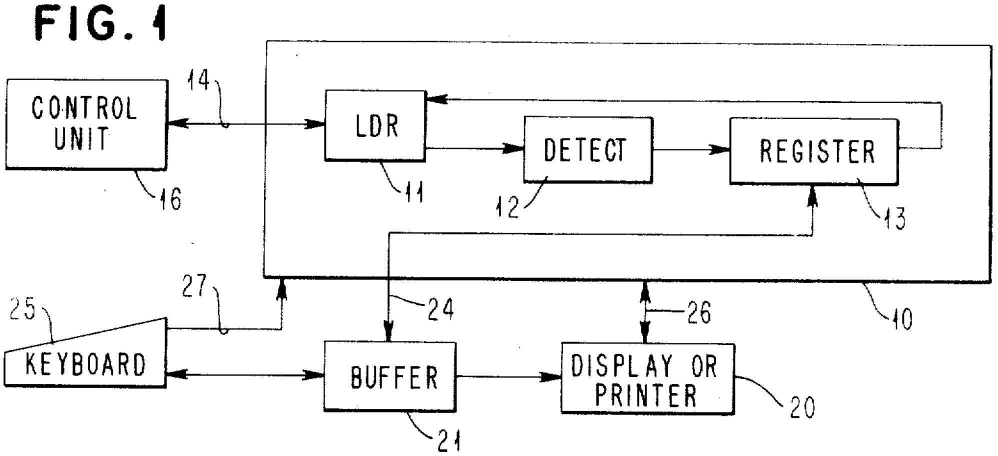
FIG. 1 shows the interconnections of the circuit of this invention with a control unit and with other components of a terminal device.

FIG. 1 shows the circuit of this invention as a block 10. Block 10 shows a line driver receiver 11, a block of circuits 12 that detect the data waveform, and the shift register 13. A coaxial line 14 or other two wire conductor system connects the line driver receiver 11 with a control unit 16. Control unit 16 is connected with a channel (not shown) for communicating with a central processor. Line 14 and the terminal device shown in FIG. 1 are typical of a large number of other terminal devices that are similarly connected to the control unit 16 of the drawing.

The terminal device may include a display or a printer 29 and a buffer 21 that holds the data and control bits for operating the display or printer. The display or printer receives several bits in parallel from buffer 21, and buffer 21 is connected to register 13 by means of a set of gates and conductors represented by a line 24 for receiving several bits in parallel from register 13. Gates and conductors 24 also transmit messages from the buffer to register 13. The terminal device may also include a keyboard 25 that is interconnected with buffer 21. Display or printer 20 supplies status signals to circuit 10 and receives control signals from unit 10 on a system of gates and conductors represented by a line 26. Similarly, keyboard 25 supplies status and receives control signals to circuit 10 through conductors and gates represented by a line 27.

III - The Message Format

A message is transmitted in either direction on line 14. Each message has 13 bit positions. FIG. 2 shows the significance of these 13 bit positions for various types of messages. As will be explained later, shift register 13 holds only message bit positions 1 through 12 at data significant times and some of the other figures show this 12 bit format with a 1 or 0 in significant positions and blanks in positions that are not significant.

Each message includes a 1 in message position 1. As will be explained later, this bit signals that register 13 has been loaded and it will be called the busy bit. Bit 12 in each message is a parity check bit. Bit position 13 in each incoming message is a 0 which produces a data entry operation but does not have data significance. Bit 13 in each output message is preset as a 1 or a 0 to identify the size of buffer 21.

The control unit supplies control words and data words to the logic and storage circuit, and the logic and storage circuit supplies data words and status words to the control unit. In a message from the control unit, a 1 in bit position 2 identifies a control word and a 0 identifies a data word. FIG. 2A shows a control unit control word that is particularly adapted for a display and is identified by a 0 in position 3. FIG. 2B shows a control word that is particularly adapted for a printer and is identified by a 1 in bit position 3. Positions 4 through 11 of the two control words carry control and status bits that will be described later. The format of a data message from control unit 16 is shown in FIG. 2C. Message bit positions 1, 2, 12 and 13 have the significance already described and message bit positions 3 through 11 contain a 9 bit word that is to be loaded in the buffer for use by the control device.

FIGS. 2D, E, and F show the format of message transmitted from the terminal device to the control unit. The entries in bit positions 1, 12, and 13 have already been described. The status words of FIGS. 2D and E contain entries that describe the state of the printer or display and thereby indicate whether the device is ready to respond to a subsequent control word from the control unit. Such devices provide a number of signals that are appropriate for this purpose. The circuits for forming the status word from these entries are described in Section VIII. In the data word format of FIG. 2F, bit positions 3 through 11 are formed from the buffer 21. The circuits and operation for transferring a buffer word to register 13 and forming a message are described in Section XI.

IV - The Data Waveform

Figure 3A:
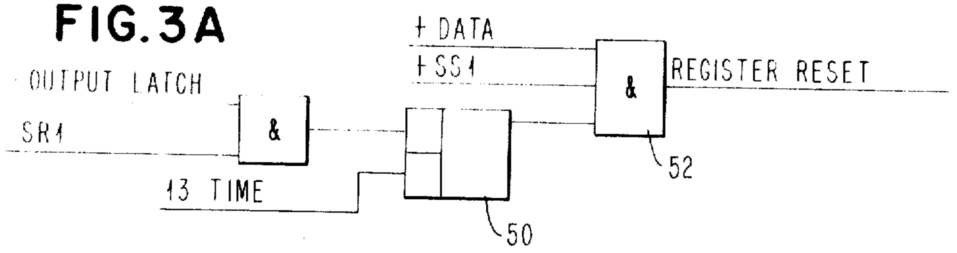
FIG. 3A shows a circuit for resetting a register at the end of a message receiving operation.
Figure 3B:
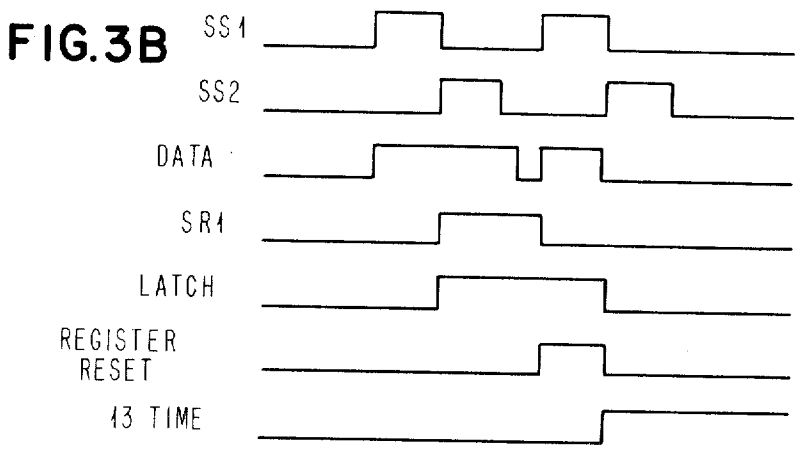
FIG. 3B shows the waveforms of the received message and the circuits of FIG. 3A.

FIG. 3B shows a data waveform of a 1 followed by a 0. Each waveform occupies a predetermined time interval and for either a 1 or a 0 the signal level rises at the beginning of the time interval. This rise signifies the beginning of the time interval of a 1 or a 0 bit but does not have any data significance. At the end of the timing portion of the data waveform, the signal level remains up to represent a logical 1 or it falls to 0 to represent a logical 0. A 1 signifying waveform falls sufficiently before the end of the bit time interval for distinguishing the leading edge of a next pulse from the trailing edge of a preceding pulse.

Figure 4A:
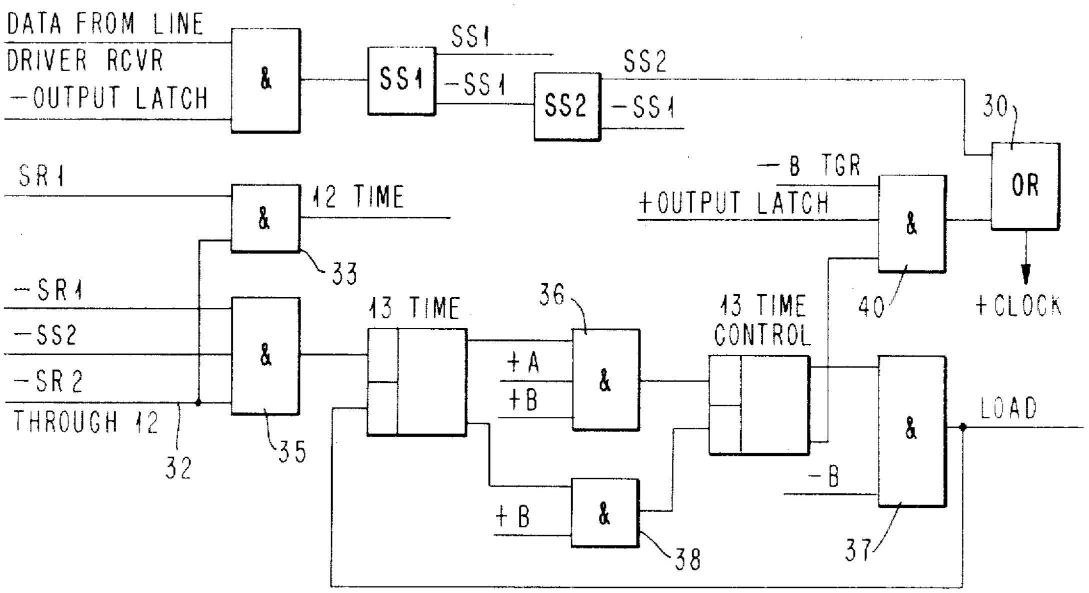
FIG. 4A shows the circuits for detecting the data waveform of FIG. 3 and some of the associated circuits that respond to these signals.

In the circuit of FIG. 4A, the data from line driver receiver 11 which has just been described is applied to set a single shot circuit SS1. The complement output of SS1 is applied to set a second single shot circuit SS2. Signal SS2 is applied through an OR circuit 30 to form a timing signal CLOCK.

The operation of these components of the circuit is shown in FIG. 3B. The signal SS1 rises as the DATA signal rises for either a 1 or a 0. The signal SS1 falls and the signal SS2 rises at a time when the signal DATA would have made the transition to the 0 value for representing a logical 0. The signal SS2 is timed to fall suitably before the fall of the signal DATA for a logical 1. Thus, the signal SS2 defines a data significant time for the waveform and the signal CLOCK is used for gating DATA signals into register 13. An alternate embodiment of the data detection circuit of FIG. 4A will be described later.

Figure 5:
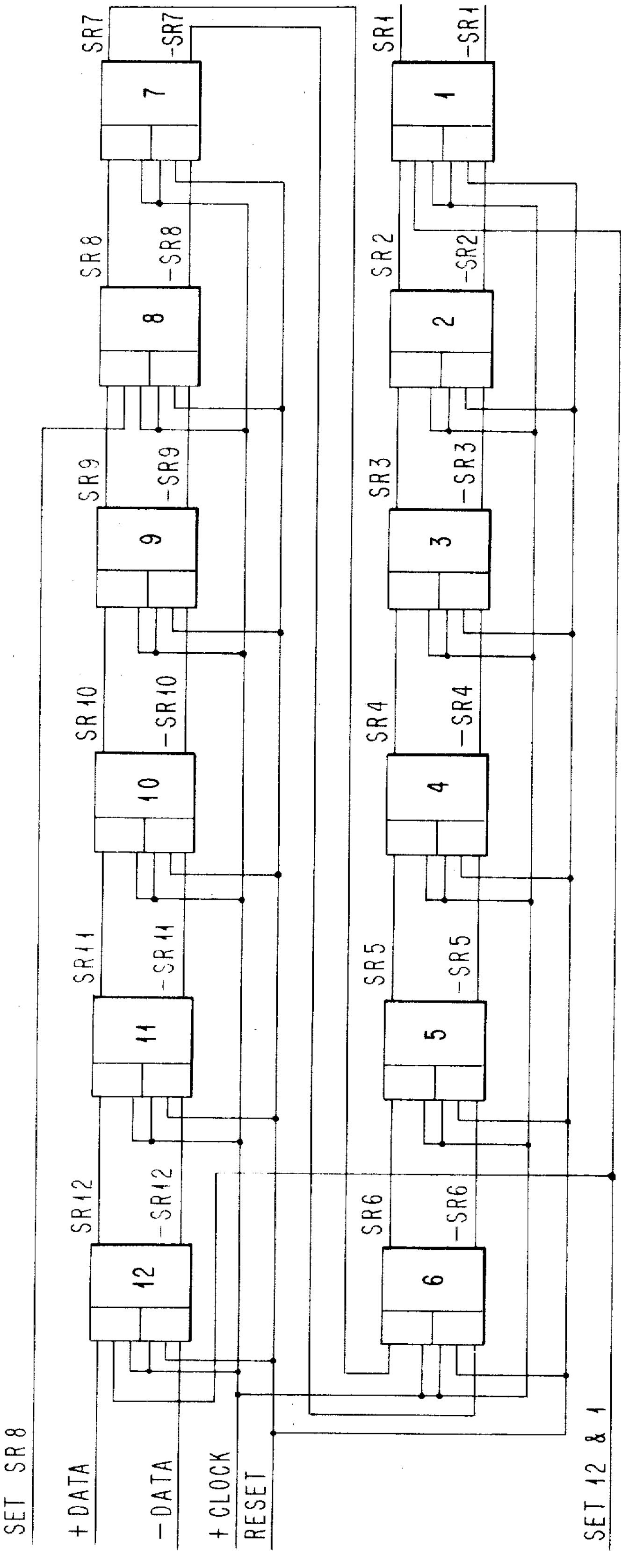
FIG. 5 shows the shift register.

V - The Shift Register - FIG. 5

FIG. 5 shows 12 latches that are interconnected to form a serial shift register. Each stage is identified with the number of the corresponding position of a message, and the register outputs are identified by the corresponding number with the prefix SR. Register stage 12 receives the signal +DATA at its set input and the signal −DATA at its reset input. The signal +CLOCK is combined in an AND logic function with the DATA signals at these inputs. Thus, during the interval SS2 shown in FIG. 3B, the up level of the data waveform for a logical 1 is applied to set register stage 12 or the complement of the down level of a logical 0 is applied to reset stage 12.

Each other stage is similarly connected to respond to the true and complement outputs of the preceding stage and the signal CLOCK for shifting the contents of each stage to the next stage. In a serial output operation, the contents of the register stages appear in sequence on the signal line SR1 at the output of register stage 1. For other operations, the register outputs are applied in parallel to various circuits that will be described later. Each stage has its reset input connected in an OR logic function with the other inputs to a signal RESET for resetting the register.

Register stage 8 has its set input connected to receive a signal SET SR8 that is combined in a logic OR function with the signal SR9 from the preceding stage and is combined in a logical AND function with the signal CLOCK. This input is typical of parallel inputs to various register stages and components that form these inputs will be described later. Similarly, register stages 1 and 12 have their set inputs connected to receive a signal SET 12&1. Setting register stage 1 forms the busy bit for the output messages shown in FIGS. 2D, E and F and the 1 in register stage 12 forms a marker bit for serial output operations that are described in Section IX. When the terminal device is a printer, register stage 2 is connected to be set for each serial output operation for forming the 1 in bit position 2 shown in FIG. 2E. When the device is a display, register stage 2 does not receive a corresponding input and message bit position 2 is a 0 as shown in FIG. 2D.

The circuit of FIG. 4A which has been described in part in relation to the data detection components, also provides register status signals 12 TIME, 13 TIME, and 13 TIME CONTROL and the register control signal LOAD. The signals 12 TIME and 13 TIME identify the time interval for the 12th and 13th bits in a serial output message. The signal LOAD identifies that register 13 is empty as a result of a preceding output shift operation and can be loaded for a next output operation.

Figure 4B:
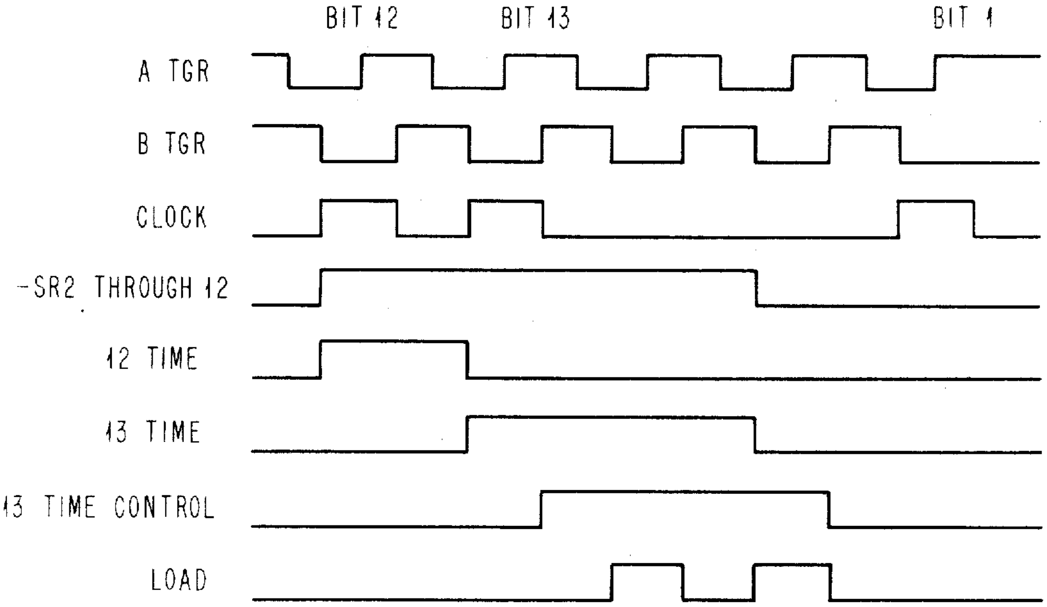
FIG. 4B shows the associated waveforms.

A line 32 carries a signal -SR2 THROUGH 12 which is an AND logic function of the complement outputs of register stages 2 through 12 and indicates that these register stages each contain 0. An AND gate 33 combines this signal with SR1 to produce the signal 12 TIME. In a serial output operation, 0's are entered into register stage 12 with each shift. Thus, after 11 shifts the 1 originally entered in register stage 12 appears in register stage 1 and each other stage contains a 0. Thus, as FIG. 4B shows, the signal 12 TIME rises with the CLOCK pulse for the 11th shift and it sets with the rise of the CLOCK pulse for the 12th shift which enters a 0 in register stage 1 and thereby closes gate 33.

An AND circuit 35 receives signals −SR2 THROUGH 12, −SR1, and −SS2 to set a latch 13 TIME. The signal −SS2 signifies that the register is not undergoing a shift operation. Thus, latch 13 TIME is set on the 13th shift of a serial output operation and at any other time the register is empty. Thus, the signal RESET which has already been introduced causes latch 13 TIME to be set. Also, the control unit can reset the register and set latch 13 TIME by transmitting a sequence of 12 0 bits. This operation is useful for clearing the register of any extraneous entries before transmitting a message from the control unit.

An AND circuit 36 combines the set output of latch 13 TIME with timing signals A TRIGGER and B TRIGGER to produce an output for setting a latch 13 TIME CONTROL in synchronism with the internal timing signals of the circuit. An AND circuit 37 combines the set output of latch 13 TIME control with the complement of the signal B TRIGGER to produce a signal load. As will be described later, other components respond to the signal LOAD to load register 13. AND circuit 35 maintains a signal at the set input of latch 13 TIME until a 1 bit is entered into one of the register stages for a serial output operation or unit the signal −SS2 falls as a result of a serial input operation. In the absence of a set input, latch 13 TIME is reset in response to the signal LOAD. An AND circuit 38 responds to the reset state of latch 13 TIME to reset latch 13 TIME CONTROL on the rise of the +B TRIGGER pulse. FIG. 4B shows this operation for the condition in which the register is loaded in response to the second of the load pulses.

As FIG. 4A shows, the reset output of latch 13 TIME CONTROL controls an AND circuit 40 to transmit −B TRIGGER pulses to OR circuit 30 for forming the CLOCK signal. AND circuit 40 also receives a signal +OUTPUT LATCH which identifies that the circuit is transmitting data rather than receiving data as will be explained in Sections VII and IX. OR circuit 30 produces CLOCK pulses from its input SS2 during data input operations and during a data output operation it produces CLOCK pulses from the timing signal −B until the register has been cleared and latch 13 TIME CONTROL is set.

The description so far has been directed to features that are common to various operations of the circuit. Other features and components of the circuit will now be explained as they appear in specific operation.

VII - The Poll Circuit and Timing

Figure 6A:
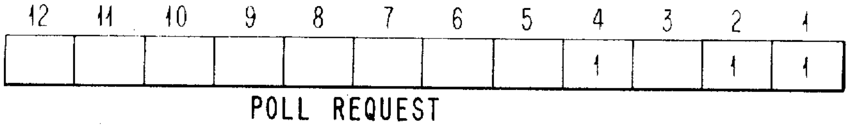
FIG. 6A shows the bit pattern of a poll request transmitted to the terminal device from the control unit.
Figure 6B:
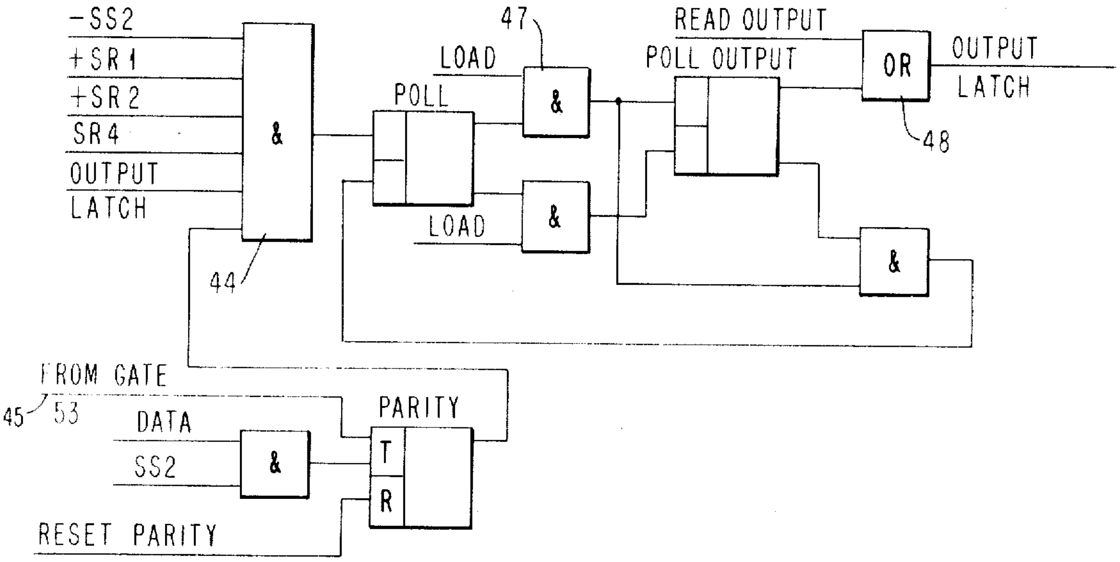
FIG. 6B shows the circuit for detecting a poll request.

FIG. 6A shows the format of a command word from the control unit that calls for a poll operation. A 1 in bit position 2 signifies that the message is a control word and a 1 in the position 4 signifies that the control word is a poll request. Thus, these inputs to AND circuit 44 in FIG. 6B are decoded as a poll request. A logical 1 from register position 1 signifies that a message has been loaded into the register and the input −OUTPUT LATCH signifies that the circuit is in a data receiving mode and not in a data output mode. The input +PARITY inhibits the circuit operation if the message is found to have invalid parity. Thus, at the time a poll request is decoded at the register output, AND circuit 44 produces an output which is applied to set a latch POLL.

The signal PARITY which is used elsewhere in the circuit is shown in FIG. 6B. A latch PARITY has a trigger input that changes the latch state from set to reset or from reset to set and it has a reset input that leaves the latch in its reset state without regard to its previous state. Two inputs are combined in an OR logic function at the trigger input. A signal on line 45 is produced by components of FIG. 7 during an output operation as will be described later. An AND circuit 46 combines the signals DATA and SS2 (FIG. 4) to change the state of the trigger each time a 1 bit appears in an input message. In the input message, bit position 12 is made a 1 or a 0 such that an odd number of 1 bits appear in the message. If the message is received correctly, latch PARITY is triggered an odd number of times an is in its set state when register 13 is loaded and it thereby enables gate 44 to respond to its other inputs.

The setting of latch POLL signifies that the register is to be loaded with a status word (FIG. 2D or E) and that the circuit is to transfer the status word to the control unit. As explained in Section V, a signal LOAD is formed after the POLL request is entered in the register, and an AND gate 47 combines the set output of latch POLL and the signal LOAD to set a latch POLL OUTPUT. An OR circuit 48 responds to the signal POLL OUTPUT or a signal READ OUTPUT (described later) to produce the signal OUTPUT LATCH which is an input to some of the components already described. Thus, the poll request message sets OUTPUT LATCH to control the operation of transmitting a status word to the control units. During this operation, latches POLL and POLL OUTPUT remain set and they are reset, as will be explained, in response to the signal LOAD which occurs at the end of the serial output operation.

FIG. 3, which has already been described in part, shows a register reset operation that occurs with message bit 13 of a poll request or other control unit message. The DATA waveform represents the 12th message bit arbitrarily as a 1 and represents the 0 that occurs in every 13th bit of an input message. Because the register is reset before such an input message, the rise of signal SR1 signifies that the first 12 bits of the message have been entered into the register. A latch 50 is set on coincidence of the signal SR1 and −OUTPUT LATCH which identifies an input operation such as a poll request. An AND circuit 52 produces the signal REGISTER RESET, already introduced, in response to the set state of latch 50 and the signals DATA and SS1 which define the timing portion of a data waveform. Thus, the 13th bit of an input message resets the register as the timing diagram of FIG. 3B shows. Thus, as the operation has been described so far, a poll request has been decoded and the POLL OUTPUT latch has been set and the register has been cleared. In the next step to be described, the register is loaded in parallel from various sources that identify the register status.

VIII - The Status Word

Figures 7, 10A:
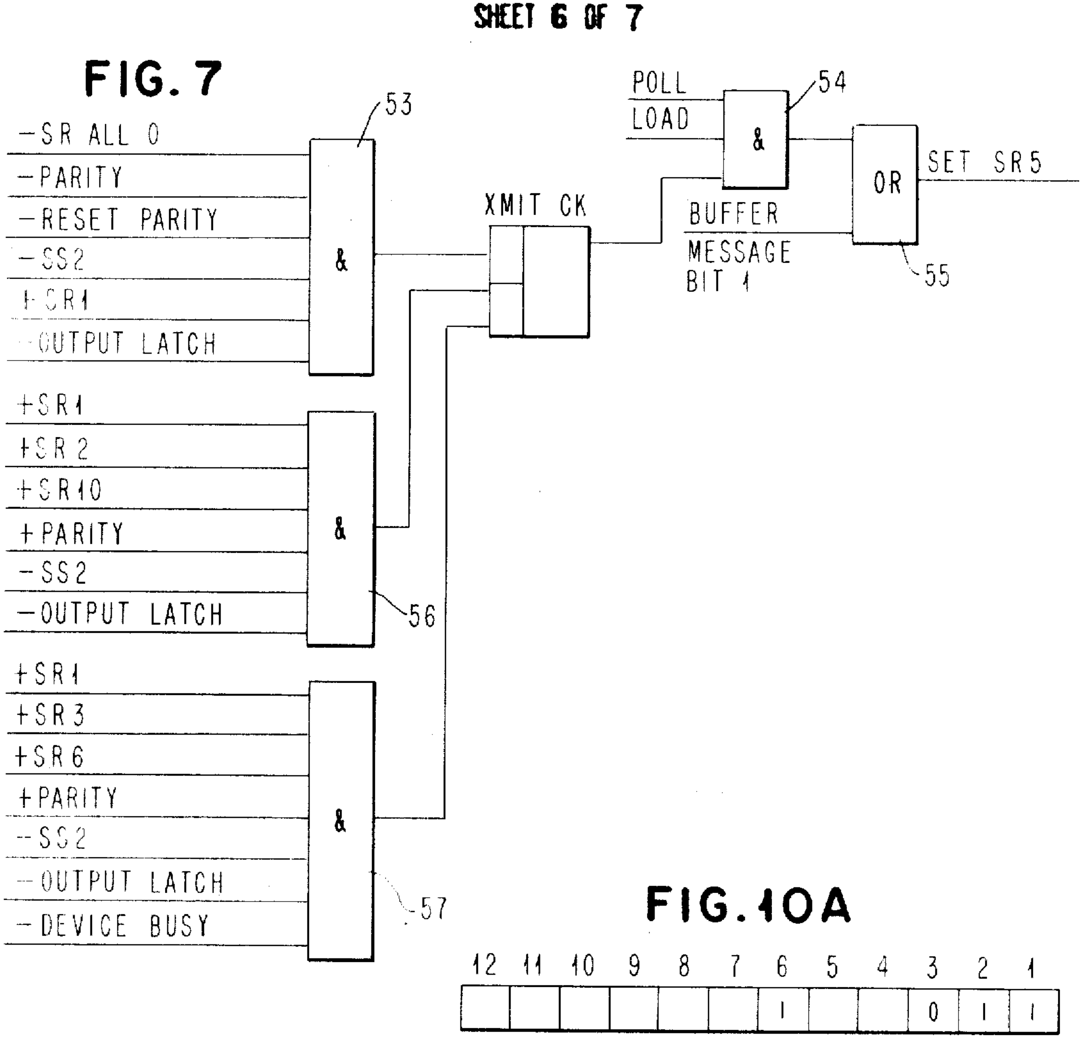
FIG. 7 shows circuits that form a status word in the register in response to a poll request.
FIG. 10A shows a bit pattern for a right command word from the control unit.

Printers, displays, and other terminal devices provide various binary status signals that can be included in a status word. The particular status signals provided by the display in the printer for which the preferred embodiment of this invention is particularly intended are shown in FIGS. 2D and E. A 1 in bit position 3 indicates that the device is busy for any of several reasons and cannot respond to a subsequent control word. In response to such a signal, the control unit would transmit another poll request at a later time. A 1 in bit position 4 indicates that there is something wrong with the device and it cannot respond to a subsequent command. A 1 in bit position 5 indicates that the poll request message had bad parity. The components that form this bit position are shown in FIG. 7 and are typical of components for forming other bit positions. A 1 in bit position 6 indicates that the device buffer has information that is to be transmitted to the control unit and that this operation should take place before information from the control unit is written into the buffer. Bit positions 7 through 11 of the display status word originate in the buffer and are loaded in a way that is similar to the data load operation that will be described in Section X. Bit positions 7, 9, and 10 of the printer status word identify various printer conditions and these bits are formed by the terminal device in the same general way as bits 3 and 4.

FIG. 7 shows the circuit for forming the status bit XMIT CK. An AND circuit 53 receives −OUTPUT LATCH which identifies an input operation, +SR1 which indicates that the buffer is loaded, −SS2 which indicates that the shift operation for loading the buffer has been completed, −PARITY which indicates that a parity error has been detected, −RESET PARITY (shown in FIG. 6B) which disables AND circuit 53 during PARITY reset, and −SR ALL 0 which is the logical AND function of the reset output of each register stage and also disables gate 53 at a time when the register content is not significant. Thus, if a parity error occurs, gate 53 produces an output to set a latch XMIT CK on the fall of timing signal SS2 during the 12th entry into the buffer. When latch POLL is set on a subsequent poll request having good parity, an AND circuit 54 responds to the coincidence of XMIT CK, POLL and LOAD to produce a signal for setting register stage 5 to form a 1 in position to the status word. An OR gate 55 combines the output of gate 54 with an output from message buffer position 1 (described later) to produce an input to register stage 5 that is similar to the circuit shown in FIG. 5 for setting register stage 8 in a parallel input operation.

AND gates 56 and 57 produce reset signals for latch XMIT CK that are combined in an OR logic function. GATE 56 responds to register bits 1, 2 and 10 which define the command RST XMIT CK in either control word, to +PARITY which signifies that the message has good parity, and −SS2 and −OUTPUT LATCH which have the same significance as these inputs to gate 53. Thus, gate 56 permits the control unit to reset latch XMIT CK by means of a control word. Gate 57 similarly responds to a control unit message having a 1 bit in positions 1, 3 and 6 and having good parity.

From a more general standpoint, various signals in the circuit of this invention or other components of the terminal device indicate a condition that is to be reported to the control unit in response to a pool request, and a latch for each signal stores the signal state. When a poll request has been decoded, the associated LOAD signal transmits the state of the latch to a predetermined stage of register 13. The latch is reset either when the associated condition changes or when the control unit transmits an appropriate message to reset the latch.

IX - The Serial Output Operation

As the operation has been described so far, the control unit has transmitted a poll request to the terminal device and as a result, OUTPUT LATCH has been set and register stages 1 through 11 have been loaded according to the status word format shown in FIG. 2D or E. As expalined in Section V, register stage 12 is loaded with a 1.

Figure 8A:
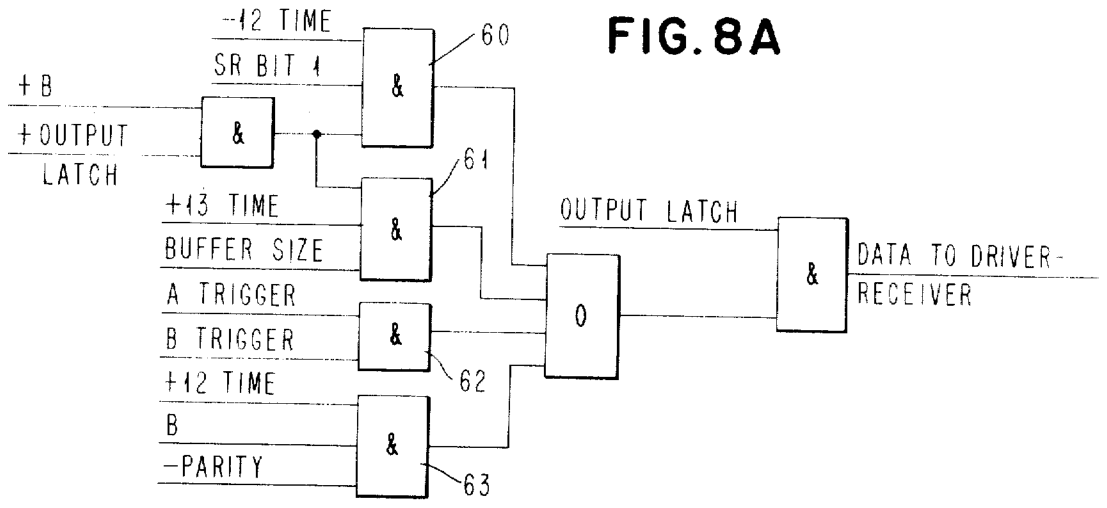
FIG. 8A shows a circuit for transmitting a message from the register to the control unit.

In the circuit of FIG. 8A, AND gates 60 through 63 receive the output SR1 of register position 1 and other signals for forming the 13 message bits that are to be transmitted to the control unit. An OR gate 65 combines the signals produced by the AND gates and an AND gate 66 gates the output of OR gate 65 to the line driver receiver in response to OUTPUT LATCH.

Figure 8B:
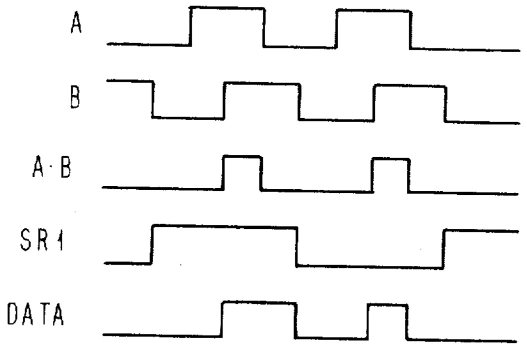
FIG. 8B shows the associated waveforms.

AND gate 62 receives the two timing signals A and B and produces a string of pulses AB shown in FIG. 8B. These pulses form the clock portion of each message bit. AND gate 60 combines the output of register bit position 1 with +OUTPUT LATCH, +B and −12 TIME to produce at its output the data portion of message bits 1 through 11. The signal −12 TIME identifies these positions in the serial output message as explained in Section V. OUTPUT LATCH identifies an output operation. FIG. 8B shows how SR1 and +B combine to produce the signal DATA for the example of a 1 followed by a 0 in register stage 1. When a 1 appears in register stage 1, gate 60 is enabled to transmit the timing signal +B to the line driver receiver. The first half of a +B pulse is the same as the timing signal produced by gate 62 and the second half forms the 1 signifying portion of the output waveform.

Gate 63 produces the 1 or 0 parity bit for position 12 of the message. Input +12 TIME identifies the 12th position of the output message. The timing signal B provides the 1 signifying data waveform as already explained, and the signal PARITY controls whether gate 63 is to produce a 1 signifying signal.

Gate 63 receives the signal +13 TIME (described in Section V) to produce message bit 13. The signal BUFFER SIZE is a permanent 1 or 0 that identifies one of two optional sizes in the buffer of the terminal device. The +B and +OUTPUT LATCH have the same significance as already described.

From a more general standpoint, the signal OUTPUT LATCH signals whether the circuit of this invention is to transmit messages serially from register 13 to the control unit or is to enter messages from the control unit into register 13. Timing signals (A and B) form the timing portion of the output waveform and advantageously timing signals also form the 1 signifying data portion of the waveform. It is an advantageous feature of the preferred embodiment of the invention that the last few bits of the message (12 and 13) are not entered into the register. Thus, the parity bit in the message is formed serially by the simple trigger circuit of FIG. 6B and the 1 initially stored in register position 12 provides a convenient marker for identifying the corresponding position in the output message. Since bit position 13 in the input message produces a shift operation without data significance, it is an advantage to form any corresponding output message bit without adding an additional register stage.

X - The Read Operation

In the operation that has been described so far, the control unit has transmitted a poll request to the terminal device and the terminal device has responded with a status word. If a status word indicates that the device is ready to respond to some additional command from the control unit, the control unit will transmit a command word (FIG. 2A or B). In the example that will be explained in this section, the control unit calls for a read operation. In a read operation, the read command word is immediately followed by a sequence of 13 bit messages in the format of FIG. 2F and the circuit of this invention transmits the data portion of these messages to the terminal device buffer.

Figures 9A, 9B, 9C:
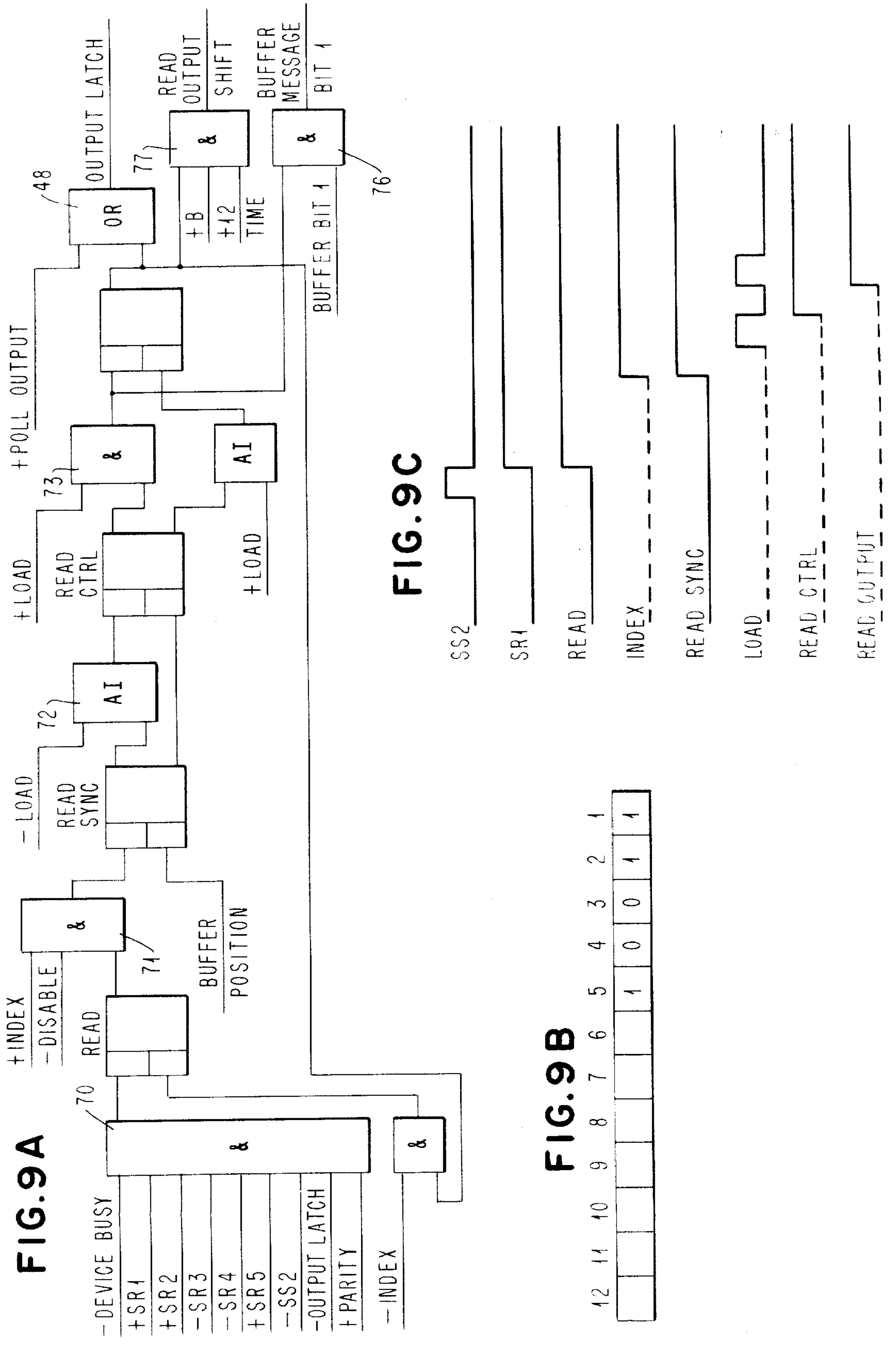
FIG. 9A shows the circuits for detecting and responding to a read command word from the control unit.
FIG. 9B shows the bit pattern for a read command.
FIG. 9C shows the associated waveforms.

The circuit of FIG. 9A responds to a control word requesting a read operation. As FIG. 9B shows, this control word has a 1 in message bit positions 1 and 2, as in all control words, a 0 in message bit position 3 designating control word 1, a 0 in bit position 4 signifying that the poll operation preceding the read request has been completed, and a 1 in bit position 5 defining the read request. In the circuit of FIG. 9A, these signals form inputs to an AND gate 70. In addition, gate 70 receives −SS2 which signifies that the register is not in a shift operation, −DEVICE BUSY which signifies that the buffer of the device is available for the read operation, +PARITY signal which signifies that the message being decoded has valid parity and −OUTPUT LATCH which identifies the message as an input from the control unit. In response to these signals, AND gate 70 produces an input to set a latch READ.

The output of latch READ is combined with timing signals in an AND gate 71 to set a latch READ SYNC. AND gate 71 receives a signal +INDEX which is provided by the buffer to signify that it is at an index position in its shift cycle. A second input, −DISABLE, is provided from other components of the device if the buffer is receiving an input, and the signal causes the circuit to wait until the buffer is ready before going ahead with the buffer read operation.

Thus, whereas latch READ is set in synchronism with data entry signals, latch READ SYNC is set in synchronism with the buffer. The output of READ SYNC is applied through an AND gate 72 to set a latch READ CONTROL on the occurrence of a −LOAD signal. The output of latch READ CONTROL is combined with a signal +LOAD in an AND gate 73 to set a latch READ OUTPUT. The set state of READ OUTPUT is combined in the OR circuit 48 (shown also in FIG. 6B) with the output of latch POLL to produce the signal OUTPUT LATCH.

Some aspects of the circuit of FIG. 9A can be understood by comparison with the somewhat simpler poll circuit of FIG. 6B. The latch READ is similar to the latch POLL in responding to the register contents that define the associated operation. The latch READ OUTPUT is similar to the latch POLL output in that it is synchronized with the internal timing of the circuit. In the circuit of FIG. 6B, this internal timing is provided by the A and B timing signals whereas in the circuit of FIG. 9A, latch READ OUTPUT is synchronized with the buffer signal INDEX and the signal LOAD.

FIG. 9C shows the operation of the circuit of FIG. 9A beginning as the 12th bit of the read control word is shifted into register 13 and SR1 rises as BUSY BIT enters register stage 1. Latch READ is set on the rise of SR1. After an undefined time interval indicated by dashed lines, the buffer shift operation reaches an index position and the signal INDEX rises and latch READ SYNC sets. As explained in the description of FIG. 4, load pulses are produced in response to the 13th bit of the input message until the register is actually loaded. The dashed line in the waveform of signal LOAD in FIG. 9C indicates that the LOAD signal is independent in phase of the other signals. After READ SYNC is set in response to INDEX, READ CTRL is set on the fall of the next load pulse and READ OUTPUT is set on the rise of the next load pulse. Thus, the four latches are approximately coordinated with various asynchronous signals.

In response to the signals described so far, register stages 3 through 11 are loaded from the device buffer and a message is transmitted to the control unit in the operation already described in Section IX. This operation has already been introduced in the description of FIG. 7 where OR circuit 55 provides an input to set register stage 5 either in response to the circuit shown in detail in FIG. 7 or in response to a signal BUFFER MESSAGE BIT 1. As FIG. 9A shows, this input is formed by an AND gate 76 in response to the signals READ CTRL, LOAD, and BUFFER BIT 1. BUFFER BIT 1 is provided from bit position 1 of the buffer at a word location addressed by the buffer circuits. Thus, the rightmost LOAD pulse is FIG. 9C loads the buffer 13, sets latch READ OUTPUT and also resets latch 13 TIME control as shown in FIG. 4. Bits 3 through 11 of register 13 are similarly set directly from the device buffer.

As FIG. 4B shows, resetting latch 13 TIME CONTROL enables gate 40 to transmit CLOCK signals to register 13 to produce a serial output operation. A LOAD pulse is again produced when latch 13 TIME CONTROL is set at the end of this operation and the register is again loaded with the next word of the buffer. During the serial output operation of register 13, a gate 77 responds to the coincidence of READ OUTPUT, +B TRIGGER, and +12 TIME to produce a signal READ OUTPUT SHIFT that advances the device buffer to a next word location for loading register 13 with the next buffer word in response to the LOAD pulse.

The entire device buffer is read and transferred to the control unit in the operation just described. Latch READ is reset after the first message transfer when the buffer address signal −INDEX rises. Latch READ SYNC is reset from a buffer address signal BUFFER POSITION that identifies the next to the last read operation. READ CTRL resets with READ SYNC. READ OUTPUT resets with the LOAD signal following the complete buffer read and thereby closes gate 66 in FIG. 8A to end the transmission.

XI - The Write Operation

Figure 10B:
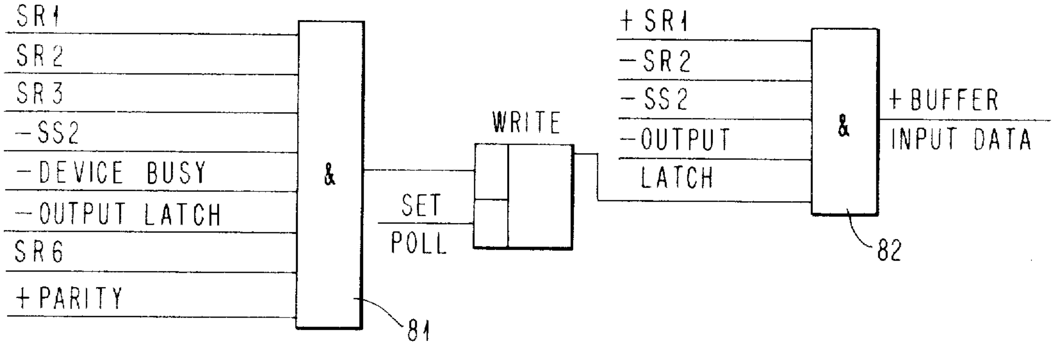
FIG. 10B shows a circuit for detecting the right command word a write command word from the control unit.

In a write operation, the control unit transmits a write command word and a succession of messages that are entered serially in register 13 and then transferred in parallel to the device buffer. The control unit terminates this operation by transmitting a poll request. FIG. 10 shows the circuit that responds to the write command word.

As FIG. 10A shows, the write command word has a 1 bit in positions 1, 2 and 6 and a 0 in position 3. An AND circuit 81 responds to these register signals and to other signals that have already been described to set a latch WRITE when this control word is decoded. An AND gate 82 responds to the set state of latch WRITE and other inputs to produce a signal BUFFER INPUT DATA that signals the buffer that a message that is to be loaded into the buffer is available at the outputs of register stages 3 through 11. The signal —OUTPUT LATCH identifies an input operation, SR1 identifies that the message has been loaded into the register, —SS2 identifies that the shift operation has been completed, and —SR2 identifies the message as a control unit data word. Notice that gate 81 includes —SR2 as an input and gate 82 includes +SR2 as an input so that gate 81 opens in response to the command word and gate 82 opens only in response to the subsequent data words. The control unit ends the write operation by transmitting a poll request and latch WRITE is reset in response to a signal SET POLL which is produced by gate 44 in FIG. 6B.

From a more general standpoint, FIGS. 6, 9 and 10 show how selected message bit positions are combined with timing and status signals to produce a signal that identifies a particular command from the control unit. Ordinarily, this signal is stored in a latch until the operation has been completed and the latch is then reset. The latch output may be supplied directly to other components of the device that carry out the operation of the control word or the latch output may be combined with other timing and status signals of the circuit of this invention for controlling the operation of the circuit or the device. Thus, circuits for decoding other operations shown in FIGS. 2A and B should be readily apparent from the preceding description.

XII - Other Embodiments

In the data detection circuit described in Section IV, the timing signals SS1 and SS2 correspond in phase directly to the input data waveform whereas the internal timing signals A TRIGGER and B TRIGGER are independent in phase of the data waveform. As one consequence, the setting of latch 13 TIME in FIG. 4 is synchronized with the internal timing for the operation of FIG. 9. In an alternative embodiment of the invention, signals corresponding to SS1 and SS2 are initially synchronized with the internal timing signals A and B. For example, the data from the line driver receiver can be advanced through a shift register in synchronism with the A and B timing so that the register contents signify the occurrence of the data and timing signals of the embodiment of the invention shown in the drawing.

The circuit has been described so far with the message format of FIG. 2A particularly for a display and FIG. 2B particularly for a printer. The format of FIG. 2A is equally useful with a printer and the format of FIG. 2B is also useful with a display.

It wil also be apparent that the components of the circuit of the drawing can be embodied in a control store. In such an arrangement, bit positions 2 through 11 of a control unit control word would form an address for reading a word from the control store. This word would define the status of various gates for the first step of the selected operation and would identify a next control store address for any subsequent step in the operation.

From the description of the preferred embodiment of the invention and suggested variations, those skilled in the art will recognize a wide variety of applications for the circuit of this invention and various modifications and adaptations for the particular application.

What is claimed is:

1. A logic and storage circuit for a terminal device having a buffer for storing data transmitted in a message to said terminal device from a control unit and data to be transmitted in a message of n+1 bits from said terminal to said control unit, comprising, a serial shift register having a predetermined number of bit positions, the input stage of said shift register corresponding to the nth position in a message and the most remote stage from said input stage corresponding to the first bit position of a message entered in the register, means to detect binary data in an input data waveform from said control unit having for each 1 bit a clocking pulse followed by the continuation of said pulse to represent the binary 1 and for each 0 bit said clocking pulse followed by the absence of the continuation of said pulse to represent the binary 0 and means for entering bits of the message serially into said nth stage, means responsive to a binary 1 bit in said first bit position stage of said register to signal the completion of a message entry operation, means responsive to a predetermined binary value of a predetermined position of said register to identify a message as containing data to be stored in said buffer and responsive to the other binary value of said predetermined position to identify a message as a control word defining an operation to be performed such as storing the data of a subsequently transmitted message in said buffer and means to reset said register in response to the n+1th bit of an input message.

2. The circuit of claim 1 wherein said means to reset said register comprises a first latch, means responsive to the entry of said 1 in said first register position to set said first latch, and means responsive to the coincident set state of said first latch and said n+1th message bit to form said register reset signal.

3. The logic and storage circuit of claim 1 wherein a predetermined binary value of a second predetermined message bit position of a control word defines a poll request and said circuit further includes, a second latch and logic circuit means responsive to the occurrence of said 1 in said first register position and predetermined binary values in said second predetermined message bit position and in a third predetermined message bit position defining a poll request to set said second latch, means providing signals defining the status of components of said terminal device, means responsive to the setting of said second latch to signal the occurrence of a forthcoming output operation for transmitting a message from said terminal device to said control unit, means responsive to the resetting of said register at the end of a message to form a signal to load said register for an output operation, and means responsive to said load signal and to said status signals to load in parallel predetermined stages of said register from predetermined ones of said status signals for transmitting a status word message to said control unit.

4. The circuit of claim 3 wherein said circuit includes means producing a continuous internal timing signal having a frequency closely related to a frequency in the input data waveform but independent in phase of said data waveform, and said means responsive to the setting of said second latch includes a third latch and means responsive to the set state of said second latch and a load signal to set said third latch, and said circuit further includes means responsive to the set state of said third latch and to said internal timing signal to produce clock pulses shifting said register to produce a serial output at the output of said first register stage and means for transmitting said first register stage output to said control unit.

5. The circuit of claim 3 wherein said nth bit of said message is parity check bit and said circuit includes means for detecting parity errors in incoming messages and for forming a parity bit in an output message.

6. The circuit of claim 5 wherein said status word message includes a bit defining that a parity error was detected in a previous input message and said circuit further includes a fourth latch connected to be set in response to a parity error and means to load a predetermined bit position of said register in response to the state of said fourth latch, the set state of said second latch and a load signal.

7. The circuit of claim 6 wherein a control word message contains a predetermined bit position defining a request to reset said fourth latch and said circuit further includes means connected to reset said fourth latch in response to the coincidence of said message bit defining a control word and said message bit defining said request to reset said fourth latch.

8. The circuit of claim 6 further including means for loading a 1 into said first register stage and into said nth register stage in response to said signal of a subsequent output operation and means responsive to the occurrence in said first register stage of said 1 loaded into said nth stage to form said parity bit as said nth bit of the output message.

9. The circuit of claim 1 including means to form as as n+1th bit of an output message a preselected binary value representing fixed information.

* * * * *